United States Statutory Invention Registration [19]

[11] Reg. Number: H51

Kotora, Jr. et al. [45] Published: Apr. 1, 1986

[54] HEAT INSULATING SYSTEM FOR A FAST REACTOR SHIELD SLAB

[75] Inventors: James Kotora, Jr., LaGrange Park; Edward F. Groh, Naperville; William J. Kann, Park Ridge; James P. Burelbach, Glen Ellyn, all of Ill.

[73] Assignee: The United States of America as represented by the United States Department of Energy, Washington, D.C.

[21] Appl. No.: 783,275

[22] Filed: Oct. 4, 1985

Related U.S. Application Data

[63] Continuation of Ser. No. 598,621, Apr. 10, 1984, abandoned.

[51] Int. Cl.[4] ..... G21C 9/00

[52] U.S. Cl. ..... 376/290; 376/285; 376/289

[56] References Cited

U.S. PATENT DOCUMENTS

| | | | |
|---|---|---|---|
| 3,147,878 | 9/1964 | Wissmiller | 220/448 |
| 3,600,276 | 8/1971 | Nims, Jr. | 376/285 |
| 4,028,177 | 6/1977 | Failla et al. | 376/290 |
| 4,050,988 | 9/1977 | Lemercier | 376/290 |
| 4,298,431 | 11/1981 | Depierre et al. | 376/290 |

*Primary Examiner*—Deborah L. Kyle
*Assistant Examiner*—Richard W. Wendtland
*Attorney, Agent, or Firm*—Hugh W. Glenn; Robert J. Fisher; Judson R. Hightower

[57] ABSTRACT

Improved thermal insulation for a nuclear reactor deck comprising many helical coil springs disposed in generally parallel, side-by-side laterally overlapping or interfitted relationship to one another so as to define a three-dimensional composite having both metal and voids between the metal, and enclosure means for holding the composite to the underside of the deck.

14 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
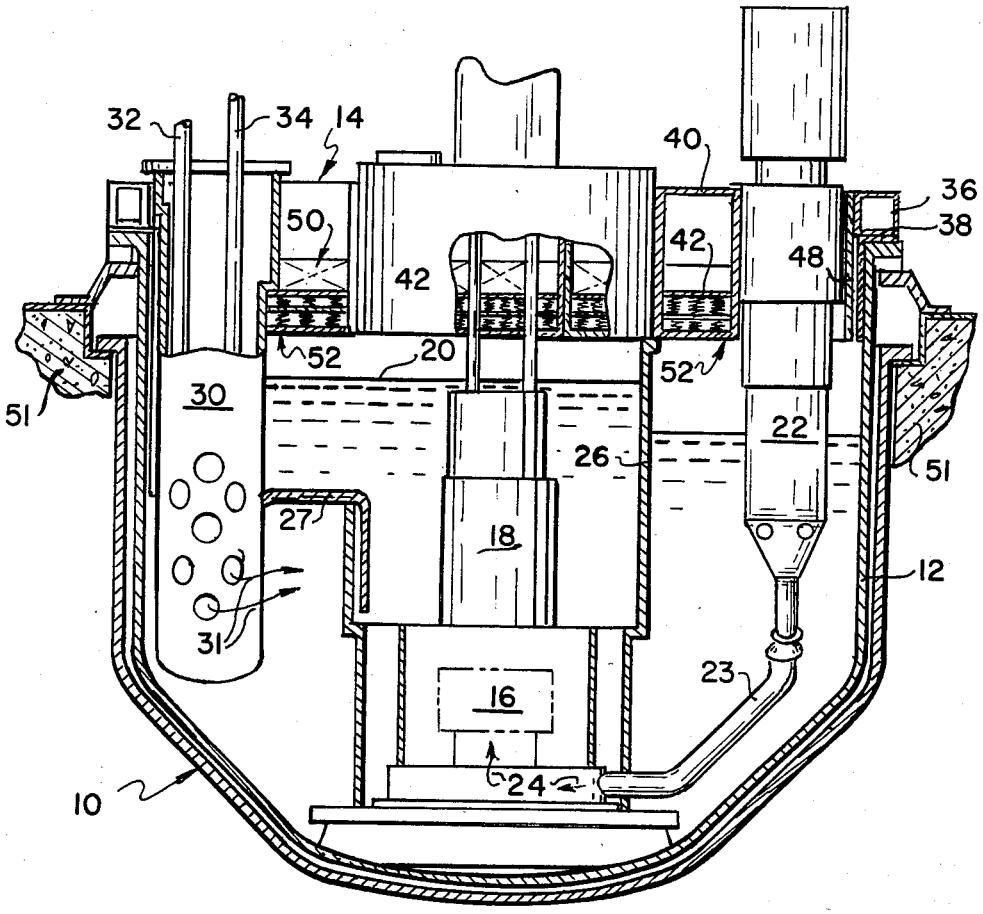
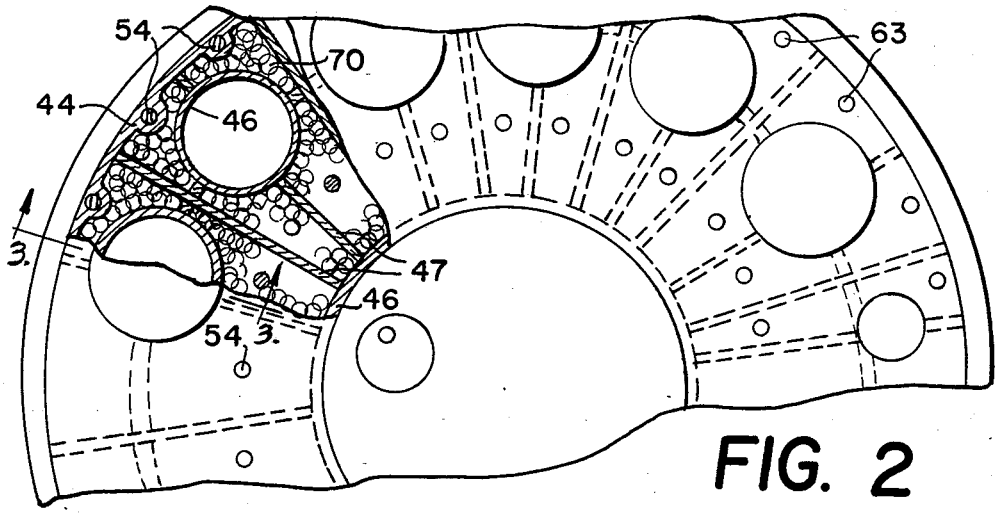
FIG. 2

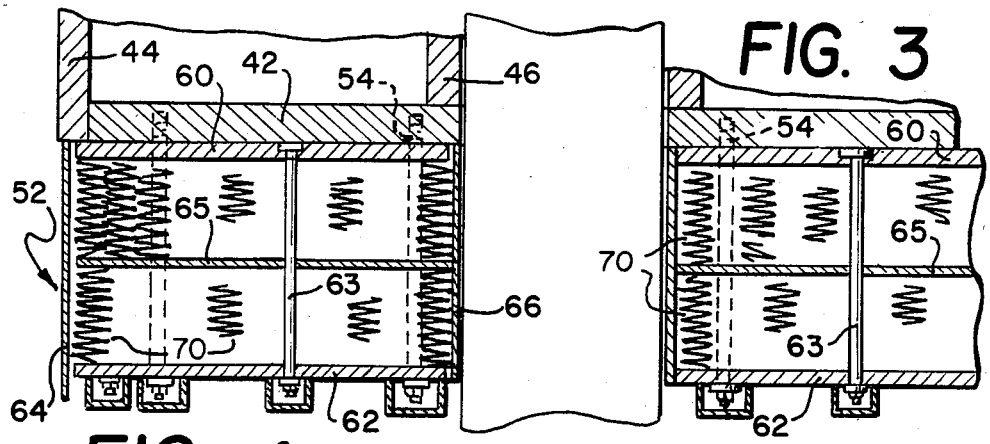
FIG. 3
FIG. 4
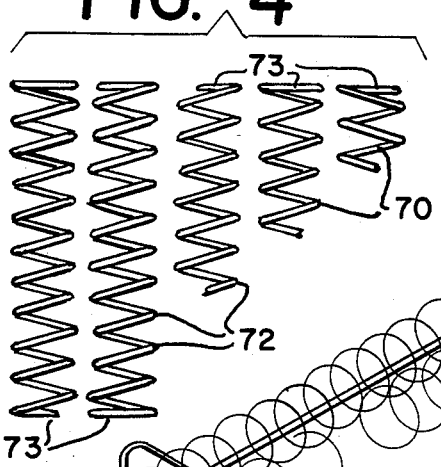
FIG. 5
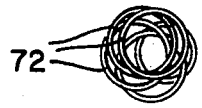
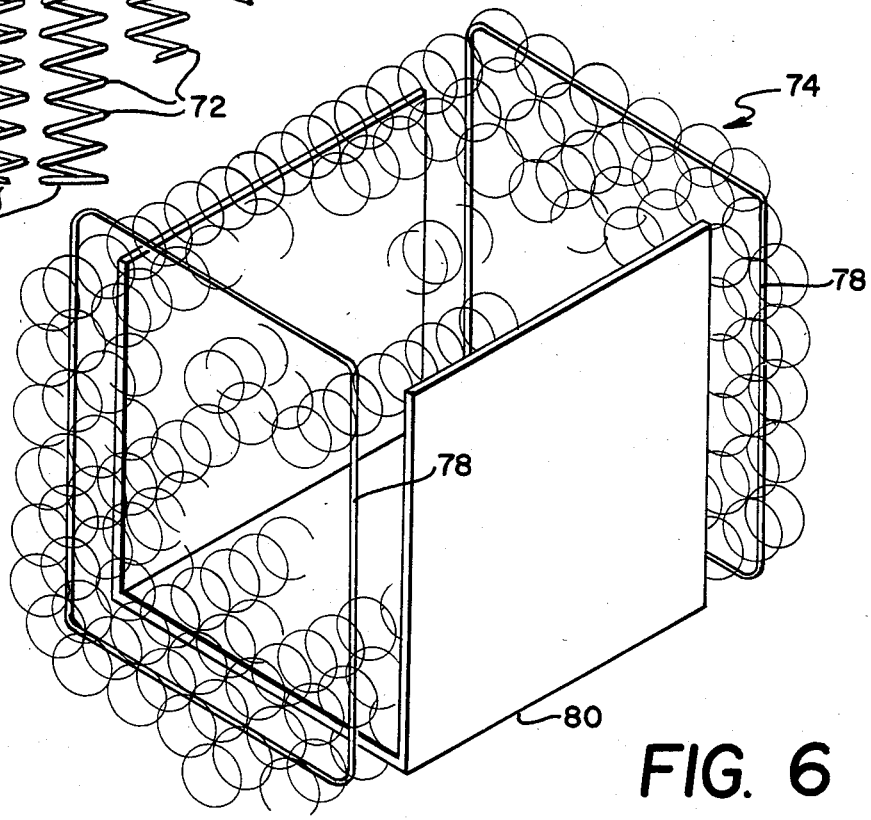
FIG. 6

HEAT INSULATING SYSTEM FOR A FAST REACTOR SHIELD SLAB

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

This is a continuation of application Ser. No. 598,621 filed Apr. 10, 1984, now abandoned.

BACKGROUND OF THE INVENTION

The conventional liquid metal fast breeder nuclear power reactor has an open top cylindrical vessel containing a core, and fissionable fuel elements are located in the core. By proper manipulation of control elements relative to the fuel elements, nuclear fission will take place in the vessel. Typically, molten sodium is used as a primary coolant to flow through the reactor core and over the fuel elements therein operable to pick up the heat of fission. This heat gain in the primary coolant is transferred via heat exchangers to a secondary circulating coolant (commonly water) which in turn is directed to remotely located steam turbines for generating electrical power. Primary coolant pumps circulate the sodium through the core and heat exchanger. A top horizontal deck across the open top of the reactor vessel seals the core from the atmosphere ambient the reactor. The pumps, the heat exchangers, and many control structures for the reactor frequently are carried by the deck, and they penetrate through the deck to have portions located inside of the reactor vessel and portions located outside of the reactor vessel.

The deck is supported by overlapping flange and shoulder configurations at the upper portion of the reactor vessel. The deck extends below the flange configuration as a downwardly projecting cylindrical portion that fits closely within the reactor vessel. This cylindrical portion is comprised of a cylindrical metal sleeve disposed coaxially of the reactor vessel, and of spaced generally parallel top and bottom transverse walls which interconnect at their peripherial edges with the cylindrical sleeve. Smaller cylindrical walls are also used to interconnect the top and bottom walls in the region where the components carried by the deck pass through the deck. Webs or gussets also are used to interconnect the cylindrical sleeve and walls and the transverse walls for structurally reinforcing the deck. This provides the dimensional stability and strength needed to support the pumps, heat exchangers, controls etc.

Depending upon the design and size of the reactor, the deck can be between one and possibly three meters in thickness. The lowermost portion of the deck is exposed to the primary coolant of sodium at elevated temperatures while the uppermost portion of the deck is exposed to the ambient atmosphere within the containment building and moderate temperatures. The deck is thus comprised of material to define barriers against the transfer of heat through the deck, as well as barrier to reduce the release of radiation through the deck.

Radiation barriers are generally formed by dense material such as concrete or steel, layered as sheets or blocks on one another to provide almost a solid obstruction blocking the path of escape of the radiation. These structures are frequently disposed within the deck, between the top and bottom transverse walls thereof.

Thermal barriers have frequently been carried on the underside of the bottom transverse deck wall, directly overlying and being exposed to the sodium coolant. One common construction provides using wire fabric or mesh, frequently in the form of stainless steel wool, which is housed then in panels or casings formed of telescoping metallic half boxes. The boxes are applied against the bottom face of the deck. This system is thermally effective, but the fabrication of the wire fabric or stainless steel mesh is very costly, and the labor factor required for cutting and shaping it to fit into the composite panel is also very high. Further, the wire fabric or steel wool mesh is comprised of many fine or small cross section strands that during shaping can be easily separated as shavings or the like from the bulk, that could fall into the reactor to cause a contamination problem. To minimize this possibility, extra care must be taken involving costly time and redundancy of structure. A drawback yet remains in that the half box constrains of the wire fabric or mesh provide relatively good conduction paths for locally transferring heat through the barrier, to reduce its overall effectiveness.

SUMMARY OF THE INVENTION

This invention relates to a deck structure for closing the open top vessel of a nuclear reactor, and particularly to a thermal barrier to be used with the deck for minimizing the transfer of heat through the deck during reactor operation.

An object of this invention is to provide a thermal barrier construction that is durable and capable of withstanding corrosion that might occur caused by exposure to the liquid metal coolant within the reactor vessel.

A basic object of this invention is to provide a thermal barrier that can be formed from economically fabricated individual structures, and further that can economically be assembled together and within the deck to define the barrier.

A particular feature of the invention is to form a thermal barrier with helical coil springs having gapped adjacent coil turns, the springs being first parallelly arranged next to one another and then laterally squeezed together to force the turns of the adjacent springs into overlapping and underlapping (or interfitted) association with one another to define a three-dimensional clusters of spring metal and voids yielding some density, which, when compared to the specific density of the spring metal, would yield a ratio less than one. The spring clusters would fill a deck cavity as needed for establishing the effective thermal barrier. Wire ties can be used for binding many individual springs together in the clusters to simplify handling and assembly.

The density-to-specific density ratio can be adjusted to vary the thermal barrier to that desired merely by varying the coil diameter of the helical spring, or the wire diameter of each spring turn, or the degree of interfit of the adjacent springs laterally into one another. Also, the clusters of the springs can be arranged laterally adjacent one another between the opposite upper and lower walls of the deck, and/or axially stacked on one another, separated by a separator sheet. In practice, the springs as interfitted completely fill the thermal barrier cavity of the deck.

BRIEF DESCRIPTION OF THE DRAWINGS

FIG. 1 is an elevational sectional view of a nuclear reactor showing a reactor vessel itself closed at its open top by a deck and showing also the location in the deck of the thermal-radiation barrier for which this invention pertains;

FIG. 2 is a top plan view, partly broken away and in section for the sake of clarity, of the deck as illustrated in FIG. 1;

FIG. 3 is an enlarged view of a portion of the deck, as taken generally from line 3—3 in FIG. 1, showing additional details of construction of the subject invention;

FIG. 4 is an elevational view of adjacent coil springs of the type used in the subject invention showing the springs separately;

FIG. 5 is a top plan view of the springs of FIG. 4 except showing them pressed into overlapping interfitted relationship to one another; and FIG. 6 is an perspective view of a tied cluster of the springs, showing also a fixture for holding the springs prior to tying them as a cluster.

DETAILED DESCRIPTION OF THE PREFERRED EMBODIMENT

In FIG. 1, a typical liquid metal fast breeder nuclear reactor 10 is illustrated comprising generally of an open top vessel 12 that is closed by a deck 14 to form a sealed containment. A core 16 is located within the sealed vessel containment, and fuel elements (not shown) are located in the core. Control structure 18 supported by the deck 14 projects to within the vessel 12 and is used to raise and lower the control elements (not shown) in a known manner relative to the fuel elements to control the extent of fission reaction within the core 16. Also located within the vessel is a coolant in the form of a pool 20 of sodium or other liquid metal which would completely covers the core 16. Also supported from the deck are pumps (only one being shown at 22) which again projects to within the vessel and into the pool 20 of the liquid metal coolant. The pump 22 would draw the liquid coolant in from the pool 20 and circulate it via appropriate conduits (only one at 23 being shown) through the reactor core 16 generally from the bottom thereof, as indicated by the arrows 24. The heated coolant would emerge within a randan or walled confinement 26 overlying the core 16 and be directed by conduits (only one at 27 being shown) through primary heat exchangers (only one being shown at 30) which again are supported from the deck to be returned as at arrow 31 again back to the pool. A different or secondary coolant (such as sodium or possibly also water) would be directed inwardly into the heat exchanger 30 generally along line 32 which would serve to absorb the heat from the hot liquid metal primary coolant and which would then be directed by line 34 to a second heat exchanger or evaporator (not shown) where steam would be generated and then directed to steam turbines (not shown) for the generation of electrical energy.

The deck 14 closes the open top of the vessel 12, and would typically have horizontal flange means 36 supported on opposing shoulder means 38 at the upper portion of the vessel. The deck has spaced generally parallel top and bottom walls 40 and 42, respectively, interconnected by a cylindrical wall 44 at the periphery of the deck and by cylindrical walls 46 each at the region where one of the components supported by the deck passes through the deck. This would include the upper internal control structure 18, the pumps 22, and the heat exchangers 30, and would allow for the sealed containment between the deck and the protruding component. Ribs or gussets 47 are connected at selective locations relative to the top wall 40, bottom wall 42 and/or the circumferential walls 44 and 46 in order to reinforce the deck.

A large cylindrical portion 48 of the deck is contained within the vessel 12 closely adjacent the reactor vessel and below the supporting cooperating flange and shoulder means 36 and 38. Radiation barrier means schematically shown at 50 in FIG. 1 would be located in the deck in this cylindrical portion 48 and between the top and bottom walls 40 and 42. The radiation barrier 50 minimizes the through escape from the confinement of the vessel of radioactive discharge generated in the vessel because of the presence of the reactor fuel or because of the nuclear fission reaction. The radiation barriers might be formed of sheets of metal, such as steel, laid upon one another generally paralleling the upper and lower deck walls 40 and 42, and/or a bed of concrete, and/or by a combination of these or other means. The effectiveness of the radiation barrier 50 generally is produced by the unit mass of barrier material and by its thickness, so that for any radiation to escape through the deck it must be through barrier paths of between 0.3 to 2 meters thick, for example. Lateral containment of radiation is achieved inasmuch as the reactor vessel 12 would be completely surrounded on its sides and bottom by backfill 51 of dirt or concrete.

For point of reference, the sodium outside the confines of the radan 26 might be at temperatures between 200° and 250° C. while the sodium within the confines of the radan might be at temperatures between 400° and 450° C. The upper deck wall 40 would normally be exposed to a relatively moderate temperature between 20° and 40° C., representing air ambient the reactor and within a confinement building (not shown) which would completely overlie the deck and other exposed parts of the reactor. Design standards require that the temperature differential between these two deck walls, 40 and 42, be relatively constant and small, between approximately 25° and 75° C. For these reasons, a thermal barrier 52, to which this invention relates, is secured to the underside of the lower deck wall 42 as by bolts 54 effective thereby in reducing the temperatures the lower deck wall 42 sees, to perhaps between 45° and 115° C.

As FIGS. 1, 2 and 3 show, the thermal barrier 52 is confined within an envelope comprised of a pair of spaced transverse retainer plates 60 and 62 held together by tierods 63; and peripheral circumferential wall 64 provided at the edge of the envelope and by circumferential walls 66 surrounding each of the various components (pumps, heat exchangers, controls, etc.) that would penetrate through the barrier. These circumferential walls 64 and 66 are generally an extension of the upper deck circumferential walls 44 and 46 and are generally coaxial therewith. The confined space between the transverse walls 60 and 62 and the circumferential walls 64 and 66 is of irregular shape as depicted in FIG. 2.

The thermal barrier 52 is specifically formed by many elongated helical coil springs 70, each of a typical configuration having a plurality of adjacent evenly, although widely, spaced turns 72. The springs 70 are arranged parallel to one another and interfitted with the turns overlapping and underlapping one another. The springs are interfitted in a random fashion from all sides, and is achieved merely by initially placing the springs in adjacent side-by-side relationship (as in FIG. 4) and then laterally moving them into one another (as in FIG. 5). The interfitted springs would yield a three-dimensional array or cluster having somewhat specific height bounds (length of the springs) as well as lateral or breadth bounds. The three-dimensional spring array would be comprised of the solid metal turns of the springs and the voids between the turns. The spring ends 73 might seat against the opposing walls 60 and 62 or against an intermediate parallel separator wall 65.

The springs being formed of metal thus would have reasonably good conductivity for transferring heat between the lower and upper spring ends. However, as the heat transfer path along the length of any single metal spring is quite extended, very little heat actually will pass through the helical spring itself. Moreover, the circular cross sections of the springs means that adjacent springs would generate only a point contact when the turns 72 transverse one another at a sharp angle, and would generate no greater than a line contact when adjacent turns were parallel to one another. The randomly interfitted springs, would produce a combination of all such contacts areas, both point and line; but the cumulative contact areas would be very small. This makes for a very low conductive heat transfer capacity in the direction axially of the springs. The voids adjacent the spring turns also have very low heat transfer capacity. Thus, the interfitted springs provide a very effective thermal barrier against the transfer of heat through the deck in a direction axially of the springs and/or transversely to the deck.

The thermal barrier confinement need not be sealed tight, but can have nominal clearances between the adjacent walls or can have in fact small openings in the walls. This will allow the confinement space to breathe. In this regard, the springs are preferably fabricated of a material such as 303 stainless steel to withstand exposure to the cover gases or atmosphere over the coolant itself.

The effectiveness of the thermal barrier can be varied by changing the degree to which the springs are interfitted with one another. This would determine the weight of springs confined in a given cubic space, representing the density of the array of such springs. The specific density of solid steel might be of the order of 7.5, whereas the composite density of the spring array might be reduced to between 0.1 and 0.5 of this, yielding for example a density-to-specific density ratio between 0.1 and 0.5. This relatively high mass level of the spring material nonetheless provides that the thermal barrier is also quite effective as a radiation barrier. The diameter of the helix of each individual spring could also be varied (possibly between 2 and 10 centimeters). The smaller the helix, the greater the possible interfitting of adjacent springs for increasing the spring array density. The wire diameter of the individual spring element itself could further be varied (possibly between 0.05 and 0.2 centimeters) where generally the smaller the diameter the more effective thermal barrier would be provided for a given array density. Likewise, the spacing between adjacent turns of any single spring would be a factor, where a preferred spacing would be between one and three times a single turn diameter. In other words, the springs would have an open contour so that they could be interfitted with one another to generate a reasonably dense cluster without binding unyieldingly against one another. A typical preferred thermal barrier might be between 0.2 and 1.0 meter thick and this might be formed by springs of the full length, or by shorter springs that are positioned end-to-end separated by the separator 65. Thus the length of each spring might typically be between 0.2 and 0.5 meters. The springs would not generate any significant axial loading between the upper and lower walls 60 and 62 of the thermal barrier 52 so that the tierods 63 need not be oversized to sustain any such load. In fact, the tierods would be formed of small cross section (0.2 to 1.0 cm) to minimize heat transfer axially along the rod, and might be spaced in an matrix with center line spacings between 0.5 and 2.0 meters. Likewise, the bolts 54 holding the entire thermal barrier 52 to the underside of the deck can be on a comparably arranged and spaced matrix.

As FIGS. 2 and 3 show the thermal barrier 52 is substantially coextensive of the cylindrical part 48 of the deck protruding into the reactor vessel, and is fitted around the protruding cylindrical walls 46. Because of the vast number of springs involved, the springs would preferably be grouped into clusters (one being shown at 74) of between perhaps 20 and 100 individual springs, representing between perhaps 50 and 150 kilograms of springs, and would then be bound together by wire ties 78 at the opposite ends of the springs. This binding could be done in a U-shaped fixture 80 where the ends of the springs are exposed to the ties 78. The tied clusters would greatly simplify building up or forming the thermal barrier, although the net result would be the same as the spring clusters themselves would be jammed into interfitted relationship to define the desired density.

The disclosed thermal barrier 52 is relatively economical, as the individual springs 70 are easily fabricated by conventional equipment to the exact specification called for, including the material, the helical coil diameter, the spring coil diameter, the spring length, and the gapping between adjacent turns. The springs can be tied together in a cluster within the simplified fixture 80 where thereafter the spring cluster can be fitted into the deck to speed up the assembly and handling procedures. The thermal barrier can be held relative to the lower deck wall 42 by means of the bolts 54 extended through the upper and lower thermal barrier walls.

The embodiments of the invention in which an exclusive property or privilege is claimed are defined as follows:

1. In a nuclear reactor having a reactor deck with an improved thermal barrier therebelow comprising, a plurality of single element helical coil springs, each of the coil springs disposed in substantially fixed, generally parallel, side-by-side, laterally overlapping and interfitted relation to one another to define a three-dimensional composite having both metal and voids between the coil springs, and means for holding the composite relative to the underside of the deck.

2. An improved reactor deck thermal barrier according to claim 1, wherein the helical coil springs are arranged to extend transverse to the deck.

3. An improved reactor deck thermal barrier according to claim 1, wherein the springs, are bound near their ends into clusters each of between 20 and 100 individual springs.

4. An improved reactor deck thermal barrier according to claim 1, wherein the springs are bound near their ends into clusters each of between 50 to 150 kilograms.

5. An improved reactor deck thermal barrier according to claim 1, wherein each of the springs has a helical diameter of the order between 2 and 10 centimeters.

6. An improved reactor deck thermal barrier according to claim 1, wherein each of the springs has a turn diameter of the order between 0.05 and 0.2 centimeters.

7. An improved reactor deck thermal barrier according to claim 1, wherein the density of the interfitted springs is of the order to provide a density-to-specific density ratio of between 0.2 and 0.7.

8. An improved reactor deck thermal barrier according to claim 1, wherein the thermal barrier is located within a volumetric confinement that is substantially coextensive of the deck itself, the confinement being defined by spaced upper and lower confinement walls and interconnecting circumferential walls, said helical coil springs being disposed transverse to the deck and to the upper and lower confinement walls, and tierod means for holding the transverse confinement walls together.

9. An improved reactor deck thermal barrier according to claim 8, wherein the density of the interfitted springs is of the order to provide a density-to-specific density ratio of between 0.2 and 0.7 .

10. An improved reactor deck thermal barrier according to claim 9, wherein each of the springs has a helical diameter of the order between 2 and 10 centimeters.

11. An improved reactor deck thermal barrier according to claim 9, wherein each of the springs has a turn diameter of the order between 0.05 and 0.2 centimeters.

12. An improved reactor deck thermal barrier according to claim 9, wherein the helical coil springs are arranged to extend transverse to the deck.

13. An improved reactor deck thermal barrier according to claim 12, wherein the springs are bound near their ends into clusters each of between 20 and 100 individual springs.

14. An improved reactor deck thermal barrier according to claim 12, wherein the springs are bound near their ends into clusters each of between 50 and 150 kilograms.

* * * * *